United States Patent

[11] 3,553,449

| [72] | Inventor | Homer L. Hathaway<br>Penn Hills Township, Allegheny County, Pa. |
|---|---|---|
| [21] | Appl. No. | 741,729 |
| [22] | Filed | July 1, 1968 |
| [45] | Patented | Jan. 5, 1971 |
| [73] | Assignee | Westinghouse Air Brake Company<br>Swissvale, Pa.<br>a corporation of Pennsylvania |

[54] CENTRAL OFFICE CONTROL CIRCUITS FOR REMOTE CONTROL SYSTEMS
10 Claims, 11 Drawing Figs.

[52] U.S. Cl. ........................................................ 246/3, 340/163
[51] Int. Cl. ........................................................ B61l 27/00
[50] Field of Search .......................................... 246/3, 135, 137, 162; 340/163, 23

[56] References Cited
UNITED STATES PATENTS
3,219,815  11/1965  Livingston .................... 246/3
3,444,521  5/1969  Breese ........................ 340/163
3,452,329  6/1969  Pepin ......................... 340/163

Primary Examiner—Arthur L. La Point
Assistant Examiner—George H. Libman
Attorneys—W. L. Stout and Arba G. Williamson ABSTRACT: Remote control system machine circuits incorporating solid state circuitry based on NOR logic. Each control function request is processed through a NOR circuit network which performs suitability checks and conditions a flip-flop element to register, actuate transmission of, and store the requested function. Stored control functions provide within the machine circuits a continuous check of the existing function request for each controlled apparatus at each remote location. A remote location selection network associates the single typical set of control devices with the machine circuits for the location to which selected controls are to be transmitted. Indications of the condition of each item of apparatus at remote stations are received, registered, and displayed by the machine circuits.

INVENTOR
Homer L. Hathaway
BY
W. h. Stout
HIS ATTORNEY

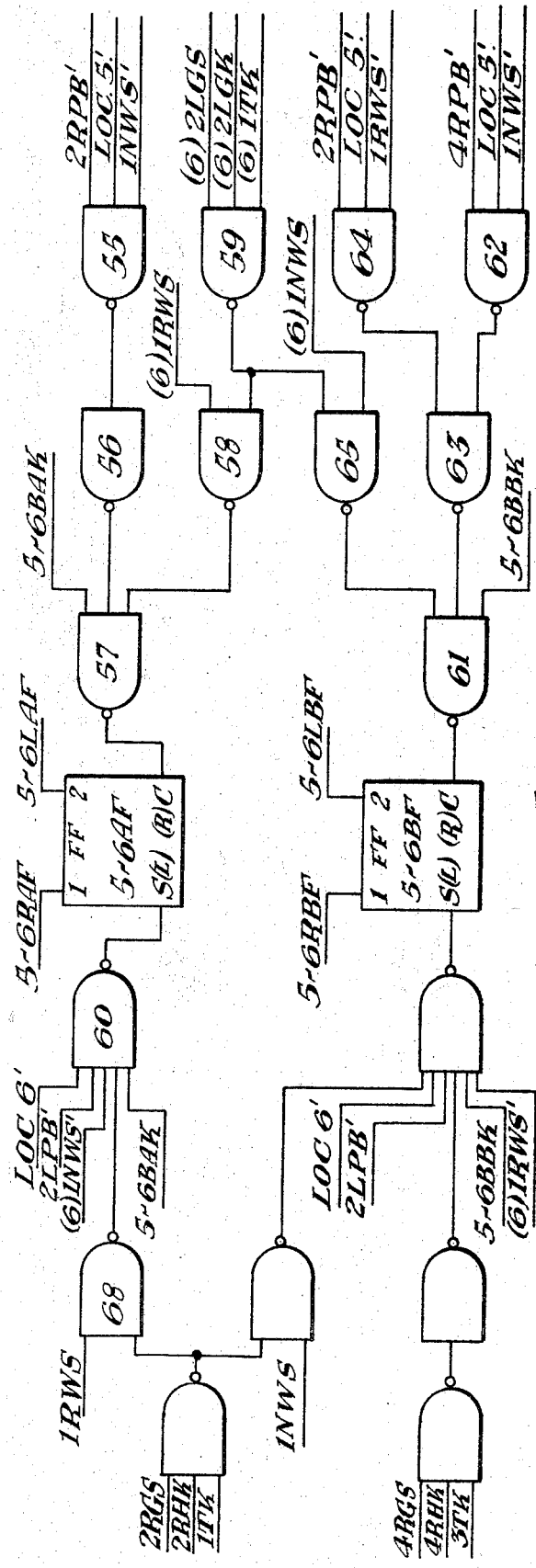
Fig.6.
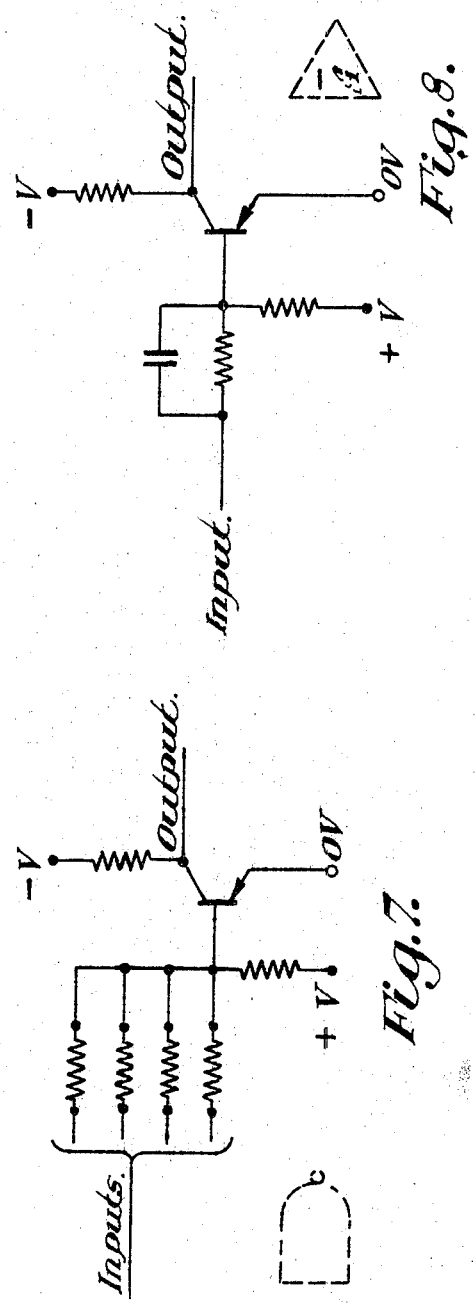
Fig.7.
Fig.8.
INVENTOR
Homer L. Hathaway.
BY W. L. Stout
HIS ATTORNEY

CENTRAL OFFICE CONTROL CIRCUITS FOR REMOTE CONTROL SYSTEMS

This invention relates to the control circuits at central office locations of remote control systems. Specifically, my invention is directed to control machine circuits, using solid state circuit elements, for traffic control centers for railroad signaling systems.

In order to obtain more efficient operation, railroads are consolidating local traffic control arrangements into centralized systems capable of being handled by one operator or dispatcher at a single central office location. As the control of more and more small districts, that is, longer stretches of the railroad, are consolidated at a single location, the control machines have gotten larger and larger, both as to circuit complexity and actual physical size. This is true even of control machines of the type disclosed in U.S. Pat. No. 3,015,722, issued Jan. 2, 1962, to F. T. Pascoe for a Centralized Traffic Control System for Railroads. In order to retain the practicability of consolidating many scattered local traffic controls into a single traffic control center, it is necessary to hold the physical size of the control machine within certain practical limits. One such limitation is the space requirements for the machine and its associated apparatus, since the construction of new buildings or even the modification of existing buildings is expensive. Further, the single operator cannot effectively observe too large a machine to keep track of the many indications which he must utilize for efficient operation of the system. This is true of the machines even when external relay racks and circuit banks are used outside of the machine itself. Using solid state elements offers one possible solution to the problem of large size requirements, providing that satisfactory, efficient, and also safe operation of the traffic control system can still be accomplished.

Accordingly, an object of my invention is the provision of an improved central office control circuit arrangement for remote control systems.

A further object of my invention is a railroad traffic control center using solid state logic circuit elements in the control machine.

Another object of my invention is to reduce the size of control machines for railroad traffic control centers through the use of solid state circuitry.

It is also an object of my invention to incorporate logic circuit elements into the control machine circuits for railroad traffic control systems.

Still another object of my invention is improved control circuits within a traffic control center control machine incorporating storage circuit elements which will receive and store selected control functions until such functions can be transmitted to the remote locations.

It is also an object of my invention to provide a logic element circuit network, within a traffic control center control machine, for each remote station of the system, which circuit network checks the selected control functions against existing system conditions and if the checks are satisfied, registers such control functions for transmission to the selected remote station and stores the functions until changed.

Other objects, features, and advantages of my invention will become obvious from the following description when taken with the appended claims and accompanying drawings.

To illustrate the practice of my invention, in this disclosure the novel arrangement is applied to a railroad traffic control system which has a central office and a plurality of remote stations controlled from the central office. Each remote station thus represents a small local railroad interlocking arrangement with track switches and/or wayside signals to control train movements. In this specific embodiment, the novel circuit arrangement is included in the control machine for the traffic system which is located at the central office or control location to establish the control functions and receive the indication functions involved in operation of the traffic control. The office and remote stations of the system are connected by a communication arrangement or system capable of transmitting the control and indication functions between the office and remote stations. It is specifically assumed that this is a solid state code control system of a type which is generally known in the signaling art although the details are not required for an understanding herein. Within the machine circuits, logic circuit elements are used to provide station selection, various checks concerning the suitability of selected or desired control functions, and storage of the selected and approved control functions. As specifically shown, for example, the system of my invention is based on NOR logic circuitry which is used to select a station and make the suitability checks and also to control the display of indications of existing field conditions and other indications regarding system of operation. The illustrated system also uses conventional flip-flop circuits to store the selected control functions until transmission to the station and thereafter as a continuing record of existing controls for check purposes. My system also employs inverting amplifier circuits of a relatively conventional type.

In operating the traffic control system, the operator of the control machine first selects the remote station at which controls are to be accomplished. He then selects the desired control functions and finally activates the system to handle the controls for transmission. After the control functions are selected, the machine circuits associate them with the selected station and perform checks in accordance with the existing conditions. These checks include those conditions within the machine control circuits and those at the field locations as recorded by received indication functions. After the checks determine the suitability of the selected controls, they are stored within the corresponding flip-flop devices. The controls are ta transmitted over the communication system as soon as possible after storage although the transmission does not cancel the storage of the existing control functions from the flip-flop device. Circuits are arranged so that interim conditions, that is, the control requests, are displayed on the indication panels of the proper station location in order to indicate the existence of requested control functions. When these controls are finally accomplished at the selected remote station, the indication functions are returned to the office to report the new conditions at that remote station. It is to be noted, of course, that indication functions may be returned to the office at any time there is a change of condition at the station in the various reported apparatus. These received indications are displayed in place of the interim condition displays activated when the control functions are initially selected and stored. It is to be noted that the final safety checks to determine whether the selected and transmitted control functions can actually be completed are accomplished by the conventional wayside signaling circuits of the traffic control system located at the remote stations. Thus any failure in the machine circuits or improper transmission of control functions cannot result in unsafe conditions for train movements along the controlled right-of-way.

I shall now describe in detail the office control machine circuits embodying one arrangement of my invention with reference from time to time to the drawings accompanying the specification in which:

FIGS. 1A and 1B when taken together, preferably but not necessarily with FIG. 1A above FIG. 1B, illustrate a portion of the track diagram of the machine, including the indication lights, and the logic and other circuits associated with the control of the indication lights and other devices located on the panel diagram for one particular remote station.

FIG. 2 illustrates schematically the logic circuitry in the control machine for remote station selection.

The illustration in FIG. 3 is a circuit diagram showing the arrangement for selecting and registering the switch position control function for a track switch such as illustrated in the schematic diagram of FIG. 1A.

The control circuits for one set of opposing signals at a wayside location such as illustrated in the track diagram of FIG. 1A are shown in FIG. 4.

FIG. 5 is a diagram of control circuits for a second set of signals at a location such as illustrated by the diagram in FIG. 1A.

The circuit diagram of FIG. 6 shows the machine traffic circuits for establishing the traffic direction over a stretch of track between the two locations illustrated in the diagram of FIG. 1A.

In FIG. 7, a typical NOR logic circuit useable in the system of my invention is illustrated.

FIG. 8 is a typical inverting amplifier circuit arrangement useable in the system of my invention.

In each of the FIGS. of the drawings, similar reference characters refer to the similar parts of the apparatus or equivalent bus connections in the illustrated circuit arrangement.

Figure 1A:
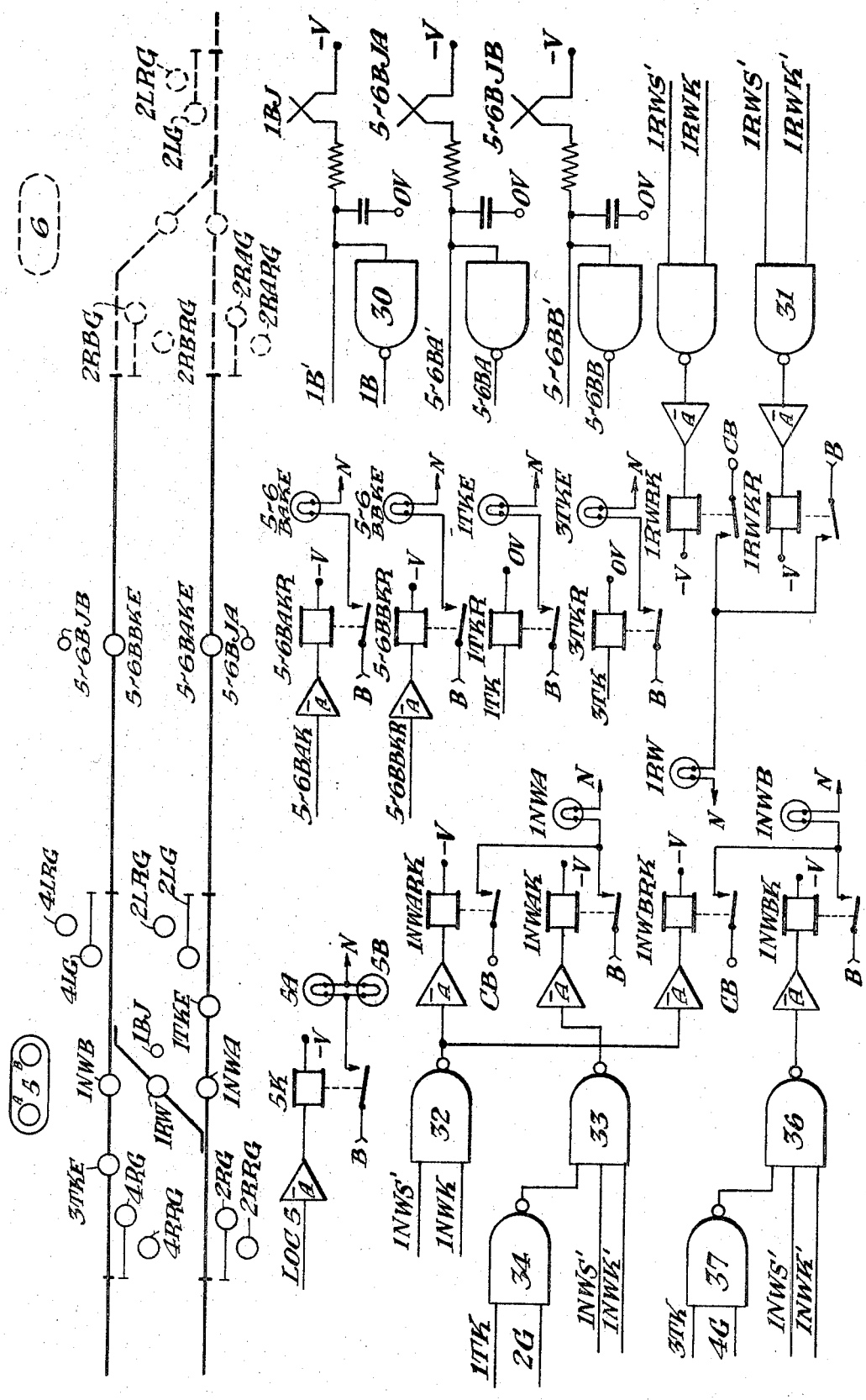
Figure 1B:
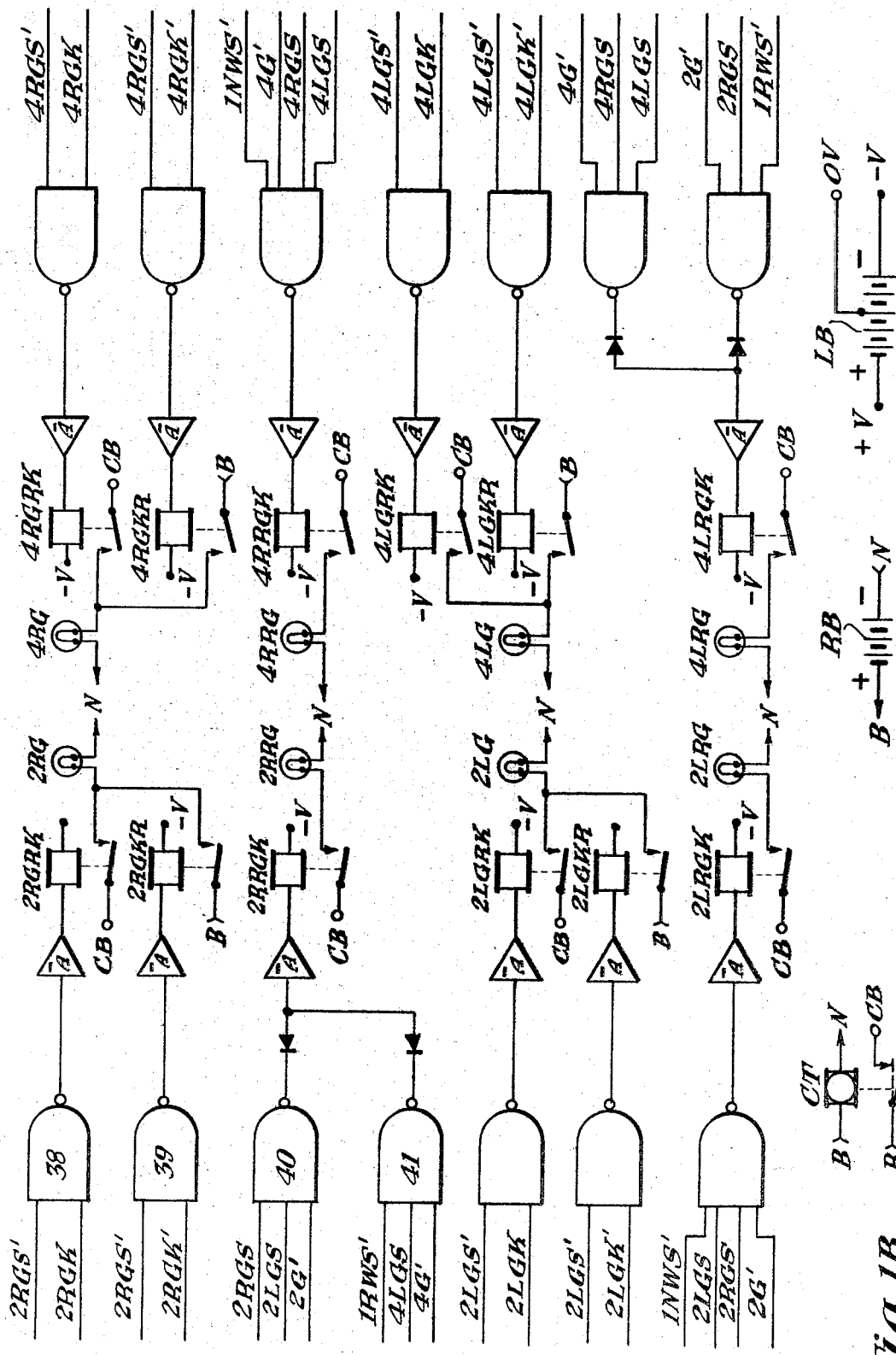

In the lower right of FIG. 1B are illustrated, in conventional form, two sources of direct current energy that are required by the circuit arrangements illustrated in the various drawing FIGS. Both of the direct current sources are illustrated as being conventional batteries but it is obvious that other forms of direct current energy sources may be used as desired. The battery LB serves as a direct current energy source for the logic circuit elements and associated apparatus and is provided with a suitable voltage level satisfactory for the particular logic circuits used. The positive and negative terminals of this battery are here designated by reference characters +V and −V, respectively. An intermediate tap designated OV provides a second terminal which is also at a positive potential with respect to negative terminal −V of the battery. These terminal provide the necessary voltage levels for the operation of the solid state devices used in this specific circuitry. As will be understood by those skilled in the art, the OV and −V potentials provide the operating signals. Wherever the reference characters designating terminals of this battery appear elsewhere in the circuit diagrams, a connection to the corresponding terminal of the battery is designated.

Battery RB provides energy for the indication lamps of the machine arrangement. The positive and negative terminals of this battery are designated by the reference characters B and N. The appearance of these symbols elsewhere in the drawings indicates a connection to the corresponding terminal of this battery. The connections from terminal B to certain of the circuits controlling indication lamps are modified to provide an additional source which provides for flashing indications under certain situations to be described later in the specification. A relay type code transmitter CT is shown in the lower left of FIG. 1B. This device is permanently connected between terminals B and N of battery RB so that it operates continually to close and open its contacts. This is illustrated by the single contact shown below the relay symbol, the movable portion of which is shown by dotted lines in each of the two operating positions to designate continuous operation. Thus terminal B of the battery is periodically connected to an additional terminal CB. When connection is made elsewhere in the drawing to such a terminal, it designates a connection to a periodic or coded direct current energy providing that the other connection is to terminal N of the corresponding battery. It is also to be understood that the indication lamps may alternatively be energized by low voltage alternating current which also would have a modified connection to provide for the flashing indications.

The specific system illustrated in the drawings is based on NOR logic operation. A typical NOR circuit useable in this arrangement is illustrated in FIG. 7 together with a conventional block symbol, shown dotted in FIG. 7, which is used in the other drawings to designate corresponding or equivalent NOR circuits in the various networks. Where a specific reference character is needed, a numeral is shown within the block. The size of the block symbol has no significance. The operation of such a NOR circuit will be understood by those skilled in the art. Briefly stated, when all inputs are supplied with the positive potential signal OV, the output lead is at the voltage potential −V. If any or all of the inputs are provided with a signal at potential −V, the output voltage is then OV. Only four input connections are shown but it is to be understood that, by proper balance between the number of input and output connections used, more inputs may be provided where necessary.

On some occasions, the output signal from a NOR circuit element must be reversed as to potential and increased in power in order to drive parallel inputs to several other devices. Under these circumstances, the inverting amplifier circuit arrangement illustrated in FIG. 8 may be used. The dotted triangle symbol also shown in FIG. 8 illustrates the conventional symbol used in the other FIGS. of the drawings to designate the inverting amplifier circuit. When the input is at the potential −V, the amplifier circuit obviously provides an output at the OV potential and, as described, at a higher energy level. Conversely, a OV input potential fails to trigger the transistor so that −V output potential results, but with sufficient level to drive several multiple inputs.

Only one other logic element is used in this specific illustration, a flip-flop circuit of any standard or conventional design. As illustrated, for example, in the center of FIG. 6, a square block symbol is used to designate this element of the circuitry, the letters FF within the block designating the flip-flop arrangement. Each flip-flop arrangement is shown with two inputs, the set input terminal designated S and a clear or reset terminal designated C. Two output terminals 1 and 2 are provided in a conventional manner. As is generally understood, the operation is such that when −V potential is applied to the S input, the outputs of OV at terminal 1 and −V at a terminal 2 result. Conversely, a −V potential applied to input connection C results in a −V output at terminal 1 and OV output at terminal 2. The details of the flip-flop circuit are not shown as any standard or conventional circuit arrangement, although preferably of the solid state type, which will accomplish the desired operation is acceptable.

Figure 9:
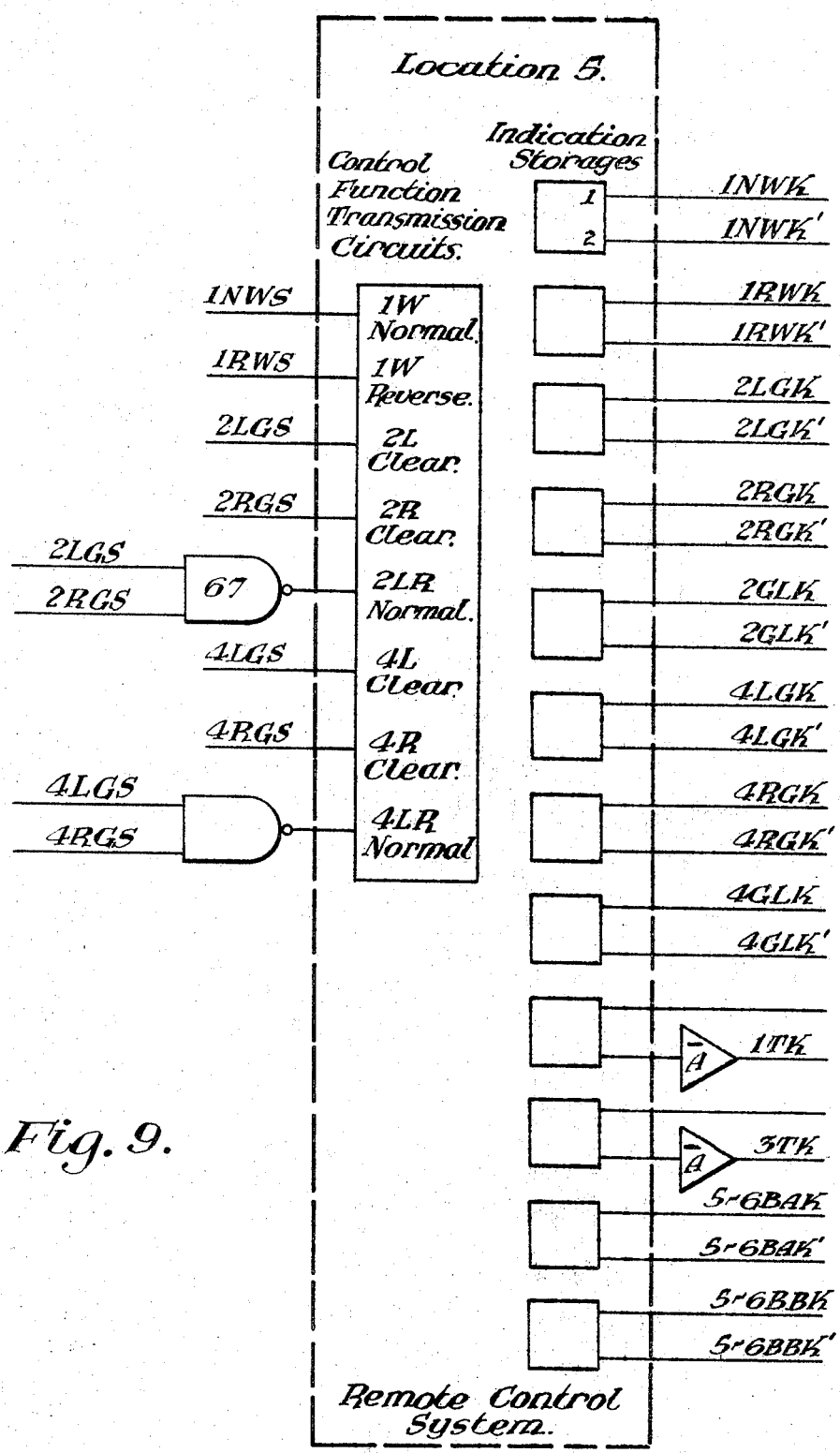
FIG. 9 is a schematic diagram showing the interface connections between the logic circuit arrangement illustrated in the other FIGS. of the drawing and that portion of the office apparatus, for the communication or remote control system which transmits control and indication functions between the office and remote locations, particularly assigned to the track diagram shown in FIG. 1A.
Figure 10:
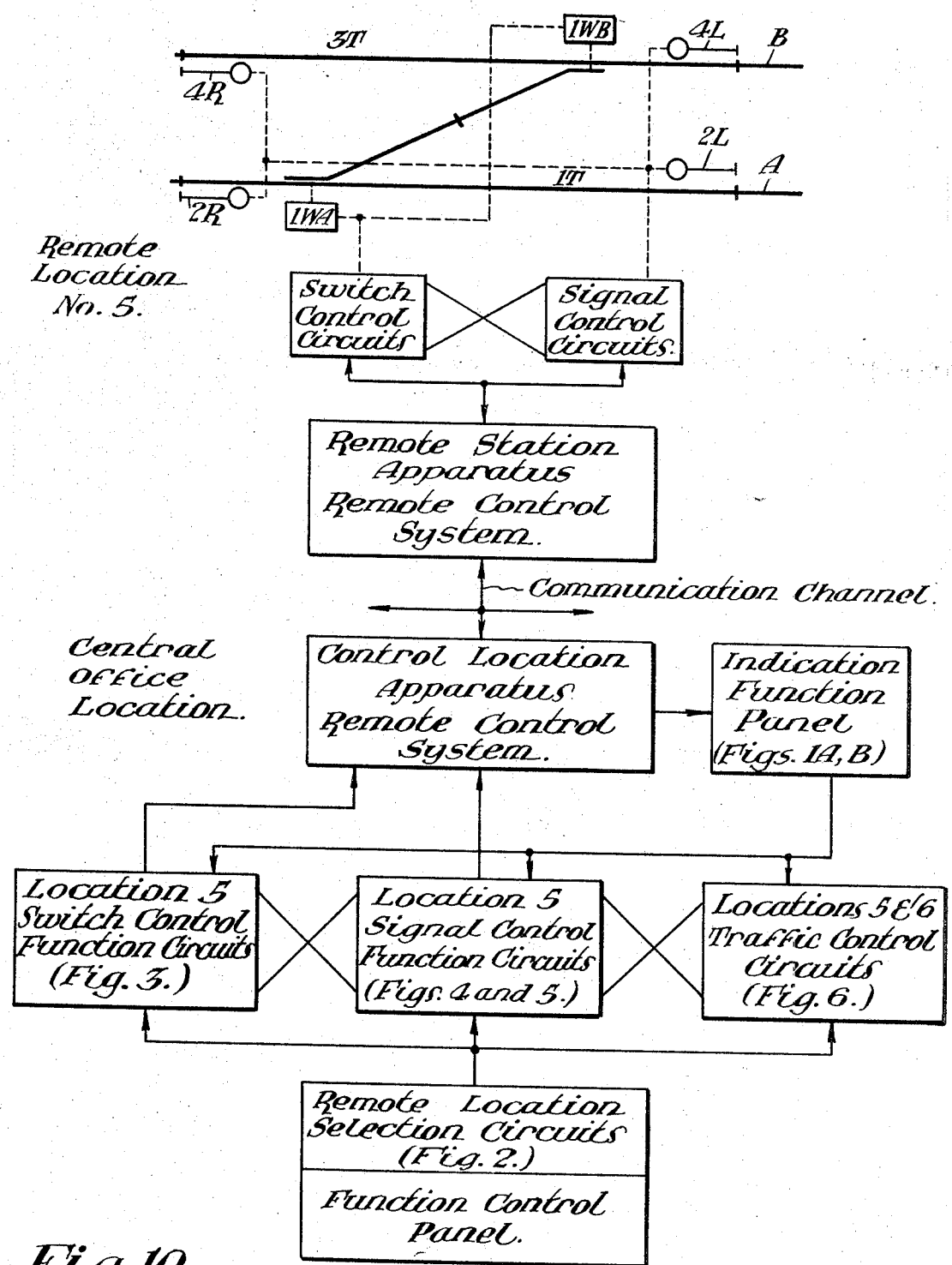
FIG. 10 is a schematic block diagram illustrating conventionally the interrelationship between the various logic circuitry in the central office, shown in other drawing FIGS. and also the general relationship with a specific field location.

Referring briefly to FIG. 9, the dot-dash rectangle occupying the center of the drawing designates that portion of the control location apparatus of the remote control system, connecting the central office and remote stations of the traffic control arrangement as shown in FIG. 10, which is specifically assigned to location 5 illustrated in FIG. 10 and by the office panel track diagram of FIG. 1A. The column of conventional blocks at the right within the rectangle and designated as indication storages are flip-flop type circuit elements so that either one or the other of the two output leads is at the −V potential depending upon the active indication received. For example, when a normal switch indication is received from remote location or station 5, a −V potential appears at terminal 1 of the top indication flip-flop. The output lead is designated 1NWK, which is conventional nomenclature. When a normal switch position does not exist at station 5, this flip-flop is conditioned so that −V appears at terminal 2, the output lead being designated 1NWK'. The prime symbol designates that a −V potential on the lead indicates that the opposite to the regular condition exists, e.g., a normal switch position does not exist. This is not to say that the field apparatus occupies its opposite position. In other words, the −V potential on lead 1NWK' does not indicate a reverse switch position at the station. Similar use of the prime symbol is made herein with each control or indication function reference character where appropriate.

Inputs to the left of dot-dash rectangle are the control function inputs. When a −V potential is applied to one of these leads, the corresponding control function is transmitted during the operation of the control system to the corresponding remote station for operation of the apparatus located there. The utility of this apparatus during the operation of the overall system will become more apparent during the following description of the entire arrangement.

Referring now to FIGS. 1A and 1B, at the top of FIG. 1A is shown a portion of a track diagram illustrative of that on the indication display panel of the control machine. The railroad tracks are shown schematically by single line symbols, each interrupted at points by various occupancy and track switch position indication lights. The remote location represented is designated by the number within the oval at the top of the track diagram, the locations shown being designated as 5 and 6. It is further assumed in the discussion that a location 4 exists off the drawing to the left of location 5. The track and lamps for location 6 are shown dotted since the controls for these indication lights are not shown in the illustrated circuit arrangements. These additional track diagram details are not necessary for an understanding of the system of my invention but are used to more easily describe the operation of the machine traffic circuits that will be discussed later. Thus the apparent duplication of reference characters at location 6 is immaterial to an understanding of the invention and is illustrative only of the manner in which the indication lamps are designated on an actual indication panel.

The track layout illustrated at location 5, which is duplicated, without the indication lights, at the field location shown in FIG. 10, is a crossover between tracks A and B, which tracks extend on to the right towards location 6. The crossover includes track switches 1WA and 1WB (references not shown in FIG. 1A) and is setoff, by conventional railroad practice, from the remaining stretches of track by insulated joints, designated by small cross marks on the single line track symbols. The portions of the tracks between the insulated joint locations are known as the switch detector track sections. As shown only in FIG. 10, the lower detector section is referred to hereinafter as section 1T and the upper as section 3T. As is also known in signaling practice, each switch is operated between its two positions, that is, normal and reverse, by switch machines, each switch machine being operated simultaneously to move the corresponding switch points from the existing to the opposite position. The position of the switches at the field location is indicated on the machine indication panel at times by the switch lamps designated as 1NWA and 1NWB for normal position of the switches and 1RW when both switches are in the reverse position. The occupancy of the switch detector track sections is indicated by the occupancy lamps 1TKE for section 1T and 3TKE for section 3T within the crossover area. Similarly occupancy of the track stretches between locations 5 and 6 are indicated in the track panel by lamps 5—6BAKE for track A and 5—6BBKE for track B.

The movement of trains through the crossover interlocking at location 5 is controlled by signals along the wayside which are designated on the indication panel by conventional symbols. These symbols are positioned adjacent the location of the track joints setting off the switch detector sections. The presence of a proceed signal indication at the field location is indicated by a light within the symbol on the panel track diagram. For example, a lamp 2RG is illuminated to indicate a clear signal indication on signal 2R. Each signal has also associated therewith a stop signal indication lamp, for example, lamp 2RRG for signal 2R, which is located adjacent the symbol for the corresponding signal. As is known to those familiar with the operation of traffic control systems, the clear signal indication on the panel is taken to be that for the route otherwise established by the switches, here the crossover switches 1WA and 1WB.

Also shown on the panel track diagram, adjacent the reverse switch lamp 1RW, is a small circular symbol designated by the reference 1BJ. This designates a blocking jack device. When a special plug is inserted in this jack by the system operator, it blocks the further operation of the switches of the crossover at location 5. In other words, the switches are held in their existing positions and are removed from further control by the operator while the special plug remains inserted in the blocking jack. This action may be taken, for example, when the switches are in their normal position to retain them so positioned and block the use of the crossover for a selected period. At other times, the blocking jack may be used to hold the switches in a selected existing position for maintenance work thereon. Similar blocking jacks are shown adjacent to block occupancy lamps 5—6BAKE and 5—6BBKE. These serve, when blocking plugs are inserted, to prohibit the clearing of the signals into the stretch of track from either end. In other words, the use of the special plug under these circumstances blocks the corresponding stretch of track against entry of any further trains into that stretch. This may be done when work trains are moving back and forth withing the within the stretch without regard to intermediate wayside signals.

Each blocking jack controls a circuit network providing two outputs for further use in the NOR logic circuitry. For example, at the right of FIG. 1A, immediately below the track diagram, is shown a conventional circuit interrupter switch symbol with represents blocking jack 1BJ. This blocking jack switch, when in closed circuit position, controls the application of potential −V to the lead 1B' and to the single input of NOR element 30. With the −V input, the output on lead 1B is at 0V potential. The output on lead 1B is considered for this network to be the standard or normal control signal, thus it is designated by the character 1B. Conversely, the opposite potential output on the other lead is considered to be the converse or opposite to normal under all conditions and is designated by the reference 1B'. Returning to the circuit network illustrated, if the plug is inserted in blocking jack 1BJ so that the circuit is interrupted, the potential −V is removed from the input lead and potential 0V through the capacitor is applied to the input of NOR element 30. Thus the potential on lead 1B is reversed to a −V potential and that on 1B' becomes 0V. Similar circuits shown immediately below the one discussed and described are provided for blocking jacks 5—6-BJA and 5—6BJB.

I shall now consider controls for the indication lamps shown in the track diagram panel at the top of FIG. 1A. Inside the oval designating location 5, two lamps 5A and 5B are illustrated. These illuminate the oval, which is of transparent material, to indicate the selection of this location or remote station by the operator for control function purposes. Control circuits for lamps 5A and 5B are shown immediately below the track diagram under location 5, that is, the crossover area. When a signal −V is applied to lead LOC5, which occurs when location 5 is selected as will be described shortly, relay 5K is energized by the 0V signal appearing at the output of the inverting amplifier through the relay winding to terminal −V. Relay 5K, thus energized, picks up to close its single contact, thus supplying energy from terminal B to lamps 5A and 5B connected in parallel, the other terminal of the lamps being connected to terminal N of the source. The lamps are thus obviously energized and lighted. Lamp driver circuits, known in the art, could be used to eliminate the use of the indication relays where shown in FIGS. 1A and 1B and such operation is included in this disclosure. However, for convenience and simplicity, the indication circuits are illustrated as controlling relays which in turn, over their contacts, control the indication lamps. If lamps driver devices are used, they will be actuated by application of energy in a manner similar to that described for the relays.

Track occupancy lamp control is shown in the center of FIG. 1A below the track diagram. For example, occupancy lamp 5—6BAKE is energized and thus lights to indicate track occupancy of track stretch A when relay 5—6BAKR is energized and picks up to close its single contact, thus connecting the lamp between terminals B and N. Relay 5—6BAKR is energized when a −V potential signal is applied over lead 5—6BAK to the input of the inverting amplifier, the output potential OV flowing through the relay winding to terminal −V. As indicated in the lower right of FIG. 9, lead 5—6BAK is provided with a −V potential when an indication is received from the field location that the corresponding track section is occupied by a train. At other times, this lead assumes the OV potential in accordance with the operation of the circuits within the remote control system. An associated lead 5—6BAK', of reverse polarity, may be used elsewhere in the logic circuitry of the machine. Similar circuits are shown for lamp 5—6BBKE.

The switch detector section lamps 1TKE and 3TKE are energized in a similar manner. For example, relay 1TKR IS energized when an occupancy indication for section 1T is received from remote location 5 and its contact closes to light lamp 1TKE. A similar circuit is obvious for lamp 3TKE. However, due to the number of inputs which are required from lead 1TK and correspondingly from lead 3TK, an inverting amplifier is used in each lead to provide sufficient energy for the multiple inputs. Thus, as illustrated in FIG. 9, the signal on lead 1TK is provided by an inverting amplifier which in turn receives its input from terminal 2 of the indication storage flip-flop of the control system. The input to the amplifier is at OV when the switch detector occupancy is received from the field and therefore lead 1TK is at −V potential. For this reason, the normal reference character 1TK or 3TK is herein used for the lead from terminal 2 of the appropriate flip-flop, after it has been passed through the amplifier. Since each lead then carries sufficient energy, a direct connection is made to the winding of the corresponding relays 1TKR and 3TKR, the other terminal of each relay winding being connected to terminal OV.

The switch position indication lamp circuits are shown on the left and across the bottom of FIG. 1A. Assuming first that the switches of the crossover are occupying their reverse position, reverse switch indication lamp 1RW will be energized. Under these circumstances, as will be explained later, a OV potential appears on both leads 1RWS' and 1RWK'. With OV potential applied to both inputs of NOR circuit element 31, the output is at −V potential. When applied to the inverting amplifier, the OV output provides energy through the winding of indication relay 1RWKR to terminal −V. This relay picks up, closing its contact to connect indication lamp 1RW between terminals B and N of the appropriate source. Lead 1RWK' and its opposite potential lead 1RWK are shown at the upper right of FIG. 9, these being supplied with energy from the indication storage flip-flop associated with the reverse switch position. The lead 1RWS' will be described later in connection with the control of the switch position through the circuits in FIG. 3 but with the switch in its reverse position, this lead is at OV potential.

Assuming now that the switches of the crossover are to be operated to their normal position, certain changes in the illuminated indication lamps will occur. The control circuits and the operation thereof for transmitting a control function to reposition the switches will be discussed shortly. It is sufficient now to indicate that, initially, the inputs to NOR element 32 (left center of FIG. 1A) are both at OV potential. Lead 1NWK is so energized because the switches are not yet indicated as being in the normal position and lead 1NWS' is thus energized because a normal switch request has been stored. In a manner similar to that described for relay 1RWKR, under this condition normal switch request indication relays 1NWARK and 1NWBRK are energized. Each relay picks up and closes its contact, thus connecting the corresponding switch indication lamps 1NWA and 1NWB between terminals CB and N of the energy source. Thus each switch lamp, while the request is being processed, is periodically energized so that a flashing indication occurs.

When both switches of the crossover are positioned normal, under usual circumstances no switch indicating position light is energized unless the corresponding switch detector section is occupied or one of the entry signals is out of its normal (stop) condition. For example, a normal switch indication relay 1NWAK is energized, through the intervening inverting amplifier, to supply steady energy to lamp 1NWA when the output of NOR element 33 is at −V. The output of NOR element 33 is at −V only when all three inputs are provided with a OV potential. With the switches positioned normal after a corresponding request, OV potential exists on leads 1NWK' and 1NWS', as will be discussed shortly. For the output of NOR element 34 to be at OV potential, one or both of the inputs must be at −V potential. If the switch detector section 1T is occupied, obviously the occupancy indication from the field will provide, through the circuits of FIG. 9, a −V potential on lead 1TK, thus fulfilling the requirements for a normal switch indication under these conditions. If this track occupancy does not exist, then one of the signals providing entry into track section 1T, that is, signal 2R or 2L must be out of its normal position to provide a −V potential on lead 2G. Referring to the upper right of FIG. 4, it can be seen that lead 2G is the output of NOR element 35 through an inverting amplifier circuit. Inputs to this NOR element are controlled in accordance with the position or condition of the signal request network and signal indications in the field. For example, if neither signal has been requested, leads 2LGS and 2RGS will be at OV potential. Likewise, if neither signal in the field occupies its clear position, leads 2LGK and 2RGK will also have OV potential. The lead 2GLK is an additional check that the signal apparatus at the field location is not in an intime condition subsequent to being returned to its stop position by a manual operation of the system operator. If this condition does not exist, OV potential also exists on lead 2GLK, through the remote control system (FIG. 9). Under these conditions, the output of NOR element 35 is at −V potential and through the inverting amplifier supplies a OV potential to lead 2G. It may be noted that a second inverting amplifier further reverses the potential of this output for the opposite lead 2G'. If any of the inputs to NOR element 35 is out of its normal condition, the resulting −V potential input provides a OV output which, through the inverting amplifier, supplies a −V potential to lead 2G. Under these conditions, NOR element 34 will provide OV output which, as the third input to NOR element 33, results in a −V output from this element and thus the energizing of relay 1NWAK. In turn this action results in the display of a normal switch indication on lamp 1NWA. A similar circuit network is used for a steady indication on lamp 1NWB except that leads 3TK and 4G are involved with the second NOR circuit 37 since switch detector section 3T and the signals 4R and 4L are associated with switch 1WB, the second switch of the crossover. It may also be noted that lamps 1NWA and 1NWB are not necessarily lighted simultaneously.

To illustrate the circuit networks involved in the signal indication lamps, the networks involved in the control of indication lamps for signal 2R, as shown in the upper left of FIG. 1B, are described as an example. When a request is made for clearing signal 2R, indication lamp 2RG is provided with periodic energy so that it provides a flashing indication. Under conditions of requesting the clearing of signal 2R, the inputs to NOR element 38 are both at OV potential. Lead 2RGK is at this potential because the signal is not yet clear or at least has not been so indicated from the field location. Lead 2RGS' is at OV potential since a signal request has been registered and, as will appear shortly in describing the circuits in FIG. 4, opposing lead 2RGS is at −V at this time. Therefore, with both inputs at OV potential, the output of NOR element 38 is at −V so that energy is supplied from the OV output of the inverting amplifier through the winding of signal request indication relay 2RGRK to terminal −V. This relay picks up, closing its contact to supply energy from terminal CB to lamp 2RG and thence to terminal N. When signal 2R is cleared as a result of the transmission of the control function to the field and the indication is returned, lead 2RGK is reversed to the −V potential, thus interrupting the energization of relay 2RGRK. However, both inputs of NOR element 39 are now at 0V potential, since lead 2RGK', being opposite to lead 2RGK, must assume the 0V potential. Since the output through the inverting amplifier is now proper to energize the indication relay 2RGKR, this relay picks up to close its contact and energize lamp 2RG by connection between terminals B and N. Preferably lamp 2RG is of green color so that the clear indication is simulated.

If signal 2R is manually restored to its normal or stop position after having been cleared, or if the signal becomes locked due to the manual restoration of an opposing signal to its stop position, indication lamp 2RRG is energized to provide a flashing indication, the lamp preferably being of red color. This action results from the energization of relay 2RRGK to pick up and close its contact, thus connecting terminal CB to the indication lamp which is otherwise connected to terminal N. The −V potential input to the inverting amplifier, which in turn supplies energy to relay 2RRGK, comes from one of the two NOR elements 40 and 41. The first of these is directly involved in the restoration of signal 2R, or its normal switch opposite signal 2L, to the stop position. Under these conditions, leads 2RGS and 2LGS, since no clear signal is now requested, are both at 0V potential. At the same time, since the apparatus at the field location under this condition places the signals in an off-normal condition, that is, locked condition, lead 2G' assumes also the 0V potential. This occurs since input lead 2GLK to NOR element 35 in FIG. 4 assumes a −V potential with the time locking indication from the field, so that the output of NOR element 35, transposed through two inverting amplifiers in series, supplies the 0V potential to lead 2G'. With all three input leads at 0V potential, NOR element 40 provides a −V output which, through the inverting amplifier, is proper for energizing relay 2RRGK.

NOR element 40 will operate in this manner with the manual return of signal 2R or 2L to its stop position regardless of the position of the crossover switches. However, if the crossover switches are in the reverse position, then the return of signal 4L to its stop position by manual control also results in the flashing indication on lamp 2RRG. Under these conditions, since the switches are reverse, input lead 1RWS' to NOR element 41 is at 0V potential. Likewise with the return to stop, that is, the removal of a clear signal control request, lead 4LGS also assumes the 0V potential. Since signal 4L is off-normal, the third input to NOR element 41, lead 4G' (FIG. 5), in a manner similar to that discussed for lead 2G', assumes a 0V potential. Thus the output of NOR element 41 is at −V potential which, through the inverting amplifier, supplies energy to relay 2RRGK sufficient to cause this relay to pick up and actuate the flashing indication. The diodes inserted in the network just described for relay 2RRGK serve to prevent sneak circuit paths which would allow improper operation when the output of either of the NOR elements 40 and 41 is in a 0V potential.

The controlling circuits for the other signal lamps are equivalent to the circuit networks just discussed except that the circuit networks for the stop signal lamps vary with the track route available. For example, it is to be noted that only a single NOR element controls the indication relay 2LRGK which provides the flashing indication for the red lamp 2LRG. Further, the single NOR element here involved has four input leads, the addition of lead 1NWS' being for the purpose of preventing the operation of the relay and thus the energization of the corresponding lamp if signal 2R is returned manually to its stop condition when the crossover switches are in their reverse position. Under these track routing conditions, of course, signal 2L is not the opposing signal of signal 2R and thus should not provide a flashing indication. Rather, signal 4L is the opposing signal and circuits are so arranged that the lamp 4LRG will provide the flashing indication under these routing conditions. The various networks for the other signal lamps are not traced in specific detail since it is believed that such may be accomplished, if desired, by reference to the above description for signal 2R and its indication lamps when taken in connection with the accompanying drawings, particularly FIG. 1B.

Figure 2:
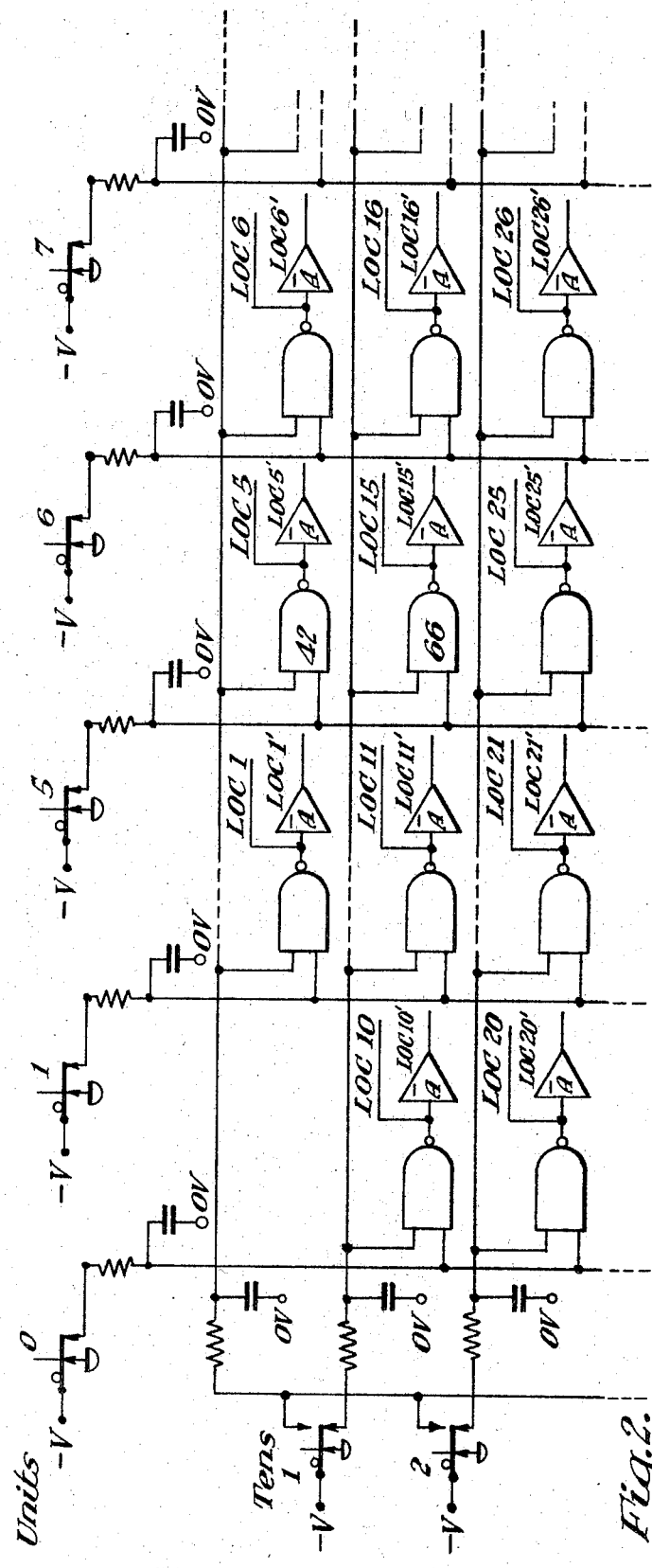

The machine circuit network for the selection of the desired location or remote station for the control functions to be transmitted is partially shown in FIG. 2, it being noted that it is a type of crossbar selection circuitry. Two sets of pushbuttons are illustrated, the horizontal row across the top of the diagram being the pushbuttons for the selection of the unit digit of the station or location number, while the vertical row at the left represents the pushbuttons for the selection of the tens digit of the station number. As shown by the standard symbol utilized for each pushbutton, these are of the stick type which hold in their depressed position when operated. They are returned to their normal or nonactuated position in one type of such buttons by the operation of another button within the same bank, for example, within the unit digit bank. Another and preferable type of return to the normal position is by solenoid release of the pushbutton, for example, when a code system start is initiated or when a cancellation pushbutton is operated, as in the aforementioned Pascoe Pat. The details of returning the pushbuttons to normal are not shown here, since such arrangements are well known.

The location or station selected is in accordance with the coordinates of the square selected in the circuit network cross connections by the operated pushbuttons. It is to be noted that, as usual in such arrangements, there is no zero station number. In addition, the horizontal bus which represents the 0 tens digit is normally held at the 0V potential, when none of the other tens pushbuttons are operated, so that single digit station numbers may be selected. This normal 0V potential is applied to that bus by the connection to that energy terminal through the capacitor shown in the upper left of the cross bar connections. As will appear, when any one of the tens digit pushbuttons is operated, this 0V potential is replaced by a −V potential due to the closing of a normally open contact on the operated push button.

As an example, in order to select location 5 whose machine circuits are illustrated in various FIGS. of the drawing, the units pushbutton 5 only is actuated by the system operator. The opening of the normally closed contact of this pushbutton removes the −V potential from the vertical bus representing the units digit 5. This −V potential is replaced by the 0V potential through the capacitor connected between the vertical bus and terminal 0V. This supplies the 0V potential to one input of each of the NOR elements in the vertical row representing the units digit 5. In addition, for the top row NOR element 42, the second input terminal is already at the 0V potential since it is connected to the 0 tens digit bus. With both inputs at 0V potential, the output of NOR element 42 becomes −V potential which is applied to the location 5 bus LOC5. Through the inverting amplifier, the LOC5' bus is placed at the 0V potential. The designation of the normal and reverse bus bars for this location is based on the fact that, when the location is actuated, the bus that assumes the −V potential is considered to be the normal bus. Under the usual conditions, with location 5 not selected, the LOC5 bus is at 0V potential since at least one input of NOR element 42 is at −v potential from units pushbutton 5. As a second example, if location 15 is to be selected, the operator actuates the units pushbutton 5 and the tens pushbutton 1. Under this condition, both inputs of the NOR element 66 are placed at the 0V potential which appears simultaneously on the vertical bus representing the units 5 position and the horizontal bus representing the tens one position. This latter change occurs through the opening of the normally closed contact of the tens pushbutton 1 so that −V is removed from this bus and 0V applied through the capacitor connected at the left of the bus. With these prevailing inputs, the LOC15 bus at the output of NOR element 66 assumes the −V potential while, through the inverting amplifier, the LOC15' bus changes to the 0V potential. It is obvious that this bus bar connection network for location selection may be expanded as necessary in order to handle the number of remote stations in any particular system. An upper limit of 99 locations is imposed, of course, but this is normally sufficient for any railroad traffic control installation.

Figure 3:
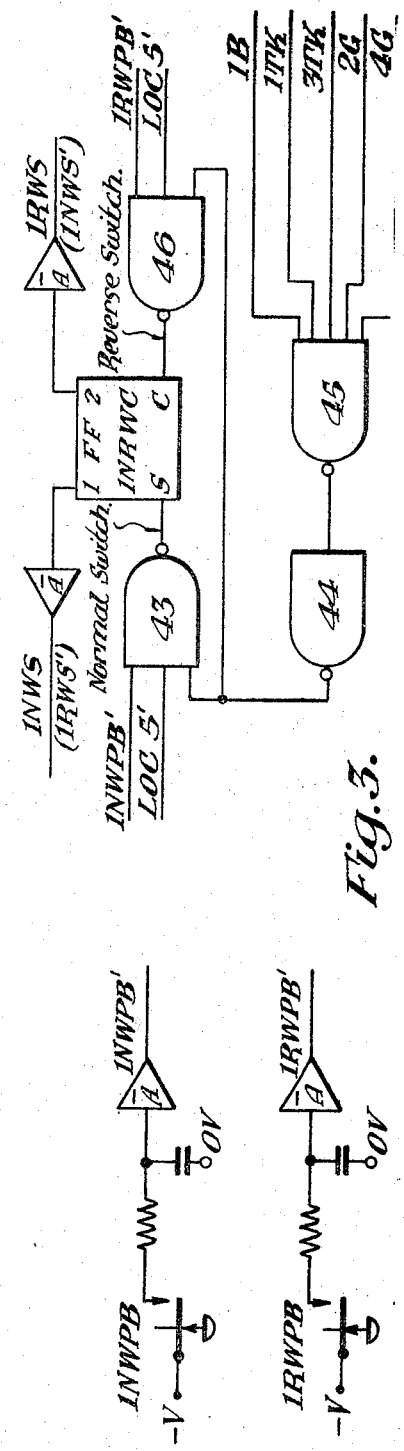

The switch control circuits for the crossover switches illustrated in the track diagram are shown in FIG. 3. A single network only is necessary since it is obvious that both crossover switches must operate simultaneously to equivalent positions. In the network at the right of FIG. 3, specifically used for the first time in this detailed description is a flip-flop circuit element previously discussed, here designated by the reference character 1NRWC, indicating that it controls the normal and reverse functions for switch number 1 in the track diagram. It is possible to use flip-flop circuits to register and store control functions if each control is arranged to be a two-position function. Obviously, a track switch has only two positions, normal or reverse. In the manner previously discussed, for a normal switch position request, potential −V is placed on input terminal S. Conversely, for a reverse switch control, the −V potential is placed on input terminal C. In establishing a request for a switch position movement, the operator of the machine first selects the location, here assumed to be location 5, in the network discussed in connection with FIG. 2. Because of the stick type pushbuttons in the location selection network, the operator's selection of a remote station holds, of course, until he has completed the other desired actions. The operator then operates the switch pushbutton on his common control panel. The control devices on the control panel, once a location has been selected, are associated by the machine circuits with that location.

One normal and one reverse pushbutton are required for each switch at a location or for each set of switches, as here in connection with the crossover. These are shown at the left of FIG. 3. The pushbuttons 1NWPB and 1RWPB are of the spring return type and have a single, normally open contact. The single contact is closed only when the pushbutton is depressed by the operator and, when the controlling pressure is removed, the pushbutton returns to its normal condition with the contact again open. Closing the contact places −V potential on the lead to the input terminal of an inverting amplifier. This overrides the 0V potential normally placed on the input terminal by the connection through the capacitor to the 0V energy terminal. With −V potential at the input, the output of the inverting amplifier is a 0V signal. Thus, if pushbutton 1NWPB is operated in order to request a normal switch position control function, the output from the corresponding inverting amplifier at 0V potential is applied to the bus 1NWPB'. Obviously, this bus is normally, that is, when the switch control pushbutton is nonoperated, at a −V potential. It is to be noted that the 0V potential on this particular bus is a momentary affair and remains only during the period that the corresponding pushbutton is operated.

Referring again to the switch control flip-flop 1NRWC, the normal switch control is established when −V potential appears on the output bus 1NWS. Since this bus is fed through an inverting amplifier from output terminal 1 of the flip-flop, a 0V potential output must be present on this output terminal. This requires that the input to set terminal S, which is the output of the NOR element 43, be at −V potential in order to request a normal switch control function transmission. This −V output from NOR element 43 will result when all three inputs are at the 0V potential. With location 5 selected, the LOC5' bus is as previously described, at 0V potential. During the period that the normal switch pushbutton 1NWPB is operated, bus 1NWPB' is also at 0V potential.

The third input to NOR element 43 comes from the check circuit network which provides a route check within the machine circuits. Since the polarity of this third input to NOR element 43 is reversed by the intermediate NOR element 44, the output of NOR element 45, which provides the check, must thus be at −V potential. This requires that each of the inputs to NOR element 45, shown in the lower right of FIG. 3, be at a 0V potential in order for the route check to be proper. The upper input, bus 1B, is at 0V potential as long as blocking jack 1BJ is free, that is, has no special plug inserted therein, so that the circuit interrupter is not actuated. This was discussed in connection with FIG. 1A, the output of NOR element 30 being bus 1B. With no train in the switch detector sections which include the crossover switches, the buses 1TK and 3TK (shown in FIG. 9) are both at 0V potential, the condition that exists when the track sections are unoccupied. As previously discussed, if all of the signals governing train operation into the switch detector sections are at their normal stop position, and are not in a timing condition due to being returned to the stop position by manual operation, both bus 2G and bus 4G will be at the 0V potential. These buses have a source in the upper right portions of FIGS. 4 and 5, respectively. With all route checks satisfied and all its inputs therefore at 0V potential, the output of NOR element 45 is at −V potential which is reversed in polarity by intermediate NOR element 44 to apply a 0V potential to the third input of NOR element 43. It is to be noted that this route check input is also applied to a third input of NOR element 46 which is involved in a reverse switch control function request. With all three inputs to NOR element 43 at 0V potential, a −V potential output is provided for application to input terminal S of flip-flop 1NRWC. This results, through the output inverting amplifier, in a −V potential on control function bus 1NWS. It may be noted that at times this lead is also designated, as shown parenthetically in FIG. 3, as 1RWS' to indicate that, when this lead is at −V potential, a reverse switch control is not requested.

Referring to FIG. 9, the application of a −V potential on lead 1NWS and thence into the remote control system apparatus associated with location 5 will result in the transmission of a normal switch control function to the remote station. The flip-flop 1NRWC remains in the set condition, when the −V input at its terminal S is removed due to the release of pushbutton 1NWPB, to store the normal switch request until a change is made. It is to be noted that similar checks are applied if switches 1WA and 1WB are to be positioned in the reverse position. Similar inputs to NOR element 46 are provided with the exception that the operation of reverse switch pushbutton 1RWPB applies a 0V potential to bus 1RWPB', the distinguishing input for NOR element 46.

Figure 4:
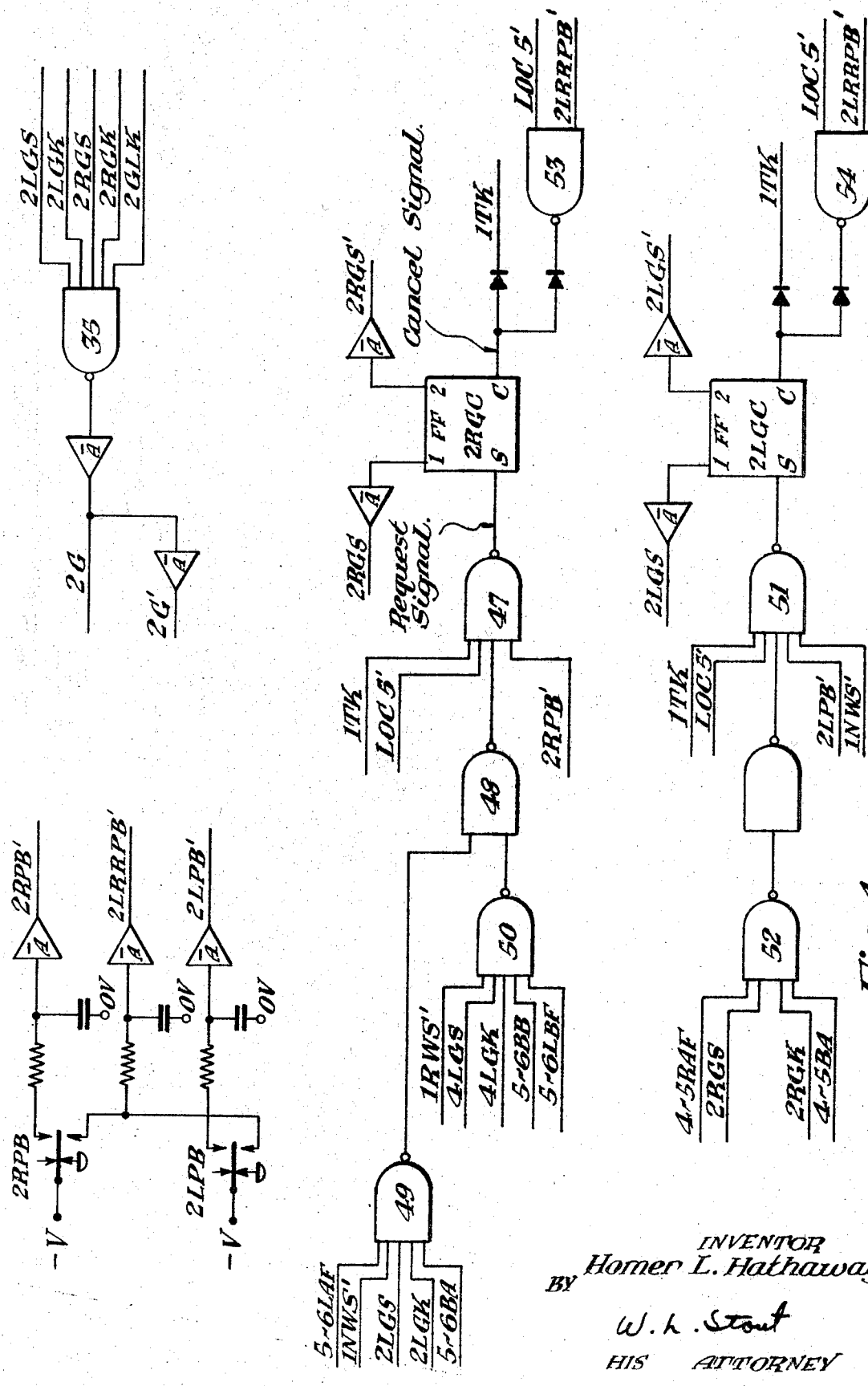
Figure 5:
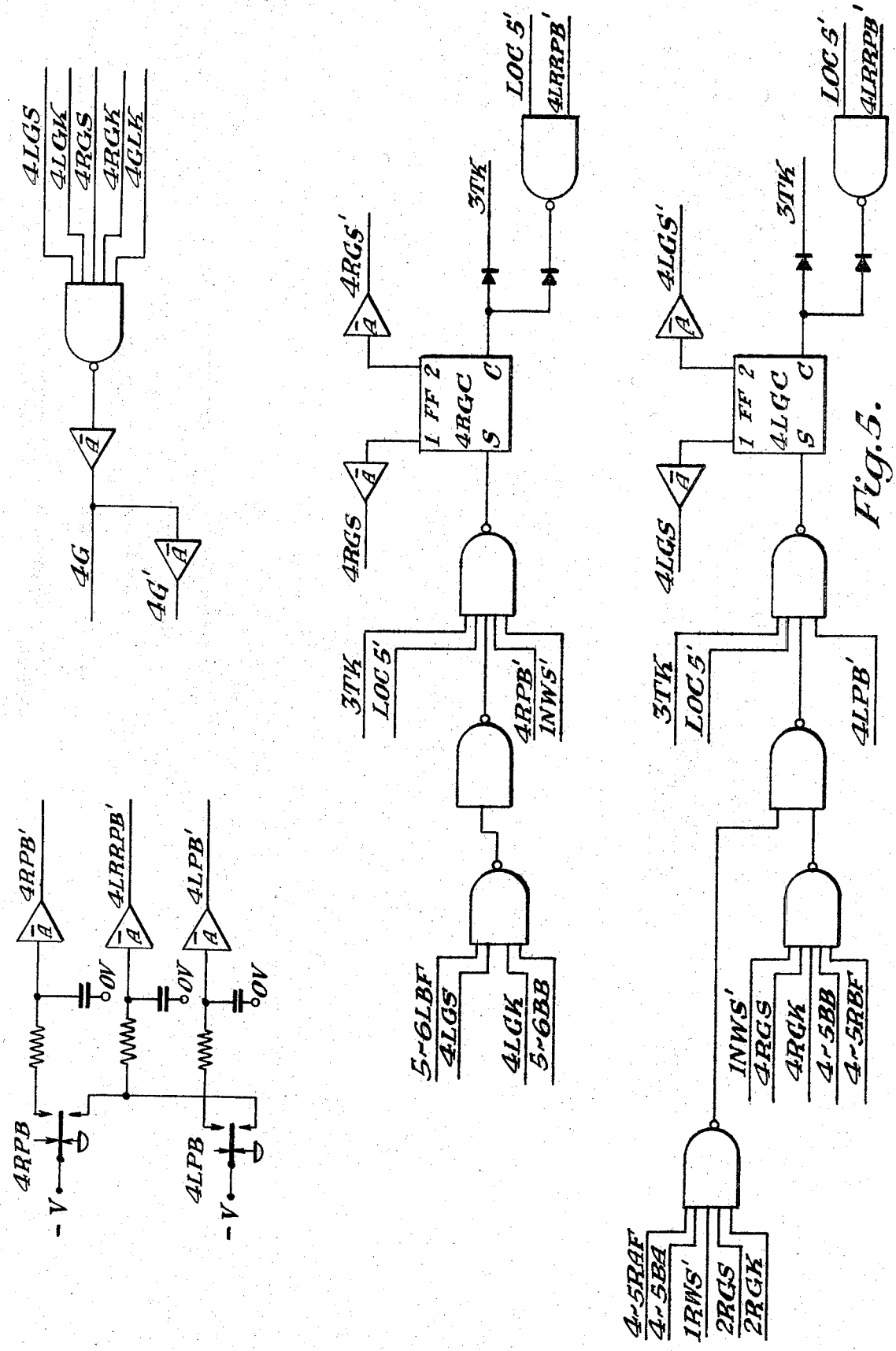

Signal control functions are registered and stored in a similar manner, the circuit networks for the signal sets 2 and 4 being shown in FIGS. 4 and 5, respectively. Each set of signals requires two pushbuttons at the particular location, for example, signal pushbuttons 2RPB and 2LPB shown in the upper left of FIG. 4. As is obvious, the pushbutton 2RPB is associated with the signal 2R governing movements to the right into the switch section while pushbutton 2LPB governs signal 2L which controls train movements to the left from the A track stretch into the switch detector section. Each of these pushbuttons is a spring return, two position or push-pull device with a normally open contact closed by operation of the device in each direction. For example, when pushbutton 2RPB is depressed, the normally open contact shown above the movable portion of the pushbutton is closed, that is, it is connected through the movable portion to terminal −V. In a similar manner, when the pushbutton is pulled, the normally open contact shown below the movable portion is closed against the movable portion and thus connected to terminal −V. When the operating pressure in either case is removed, the pushbutton by spring bias returns to normal so that the closed contact opens.

The flip-flop limitation of storing only a two position function is met by considering, in each set, the signal for each direction as having two positions or conditions, i.e., clear and stop. Thus a set of signals such as 2R and 2L becomes two two-position control functions. Two flip-flop elements are therefore used in these circuit networks for each set of signals, one associated with the requests for a clear signal and for canceling a clear signal for one direction of train movement and the other associated with the similar control requests for the signal governing train movements in the other direction. These two flip-flops, for right and left directions respectively, are designated as 2RGC and 2LGC. The output leads for flip-flop 2RGC, for example, after being passed through inverting amplifiers are designated as 2RGS, which must be at −V potential to request a clear signal on unit 2R, and 2RGS', which is at a −V potential to request the return of the signal to its stop position or the normal condition, as sometimes defined. In order to request a clear signal at signal 2R, −V potential must therefore be applied to input terminal S of flip-flop 2RGC. Such a condition is initiated by the operator by selecting a remote location such as location 5 shown in the drawings in a manner discussed in connection with FIG. 2. With location 5 selected, bus LOC5' is at OV potential and applies this signal to one input of NOR element 47. The operator then actuates pushbutton 2RPB by depressing the button so that −V potential is applied through the resistor to the input of an inverting amplifier which in turn supplies a OV potential on output bus 2RPB'. This OV potential is applied to another input of NOR element 47. As one of the route or suitability checks, bus 1TK supplies another input to NOR element 47 which, with switch detector section 1T unoccupied to satisfy this requirement, is at OV potential.

This leaves only the fourth input to NOR element 47 which is likewise the output of NOR element 48. For this output of NOR element 48 to be at OV potential, one of its two inputs must be at a −V potential. This provides the remaining required route checks, selecting between the two possible routes which may be established over the track networks, that is, with the switch 1WA normal or with the crossover in its reverse position to route the train to the other track stretch. With the crossover switches in their normal positions, or at least a request for the normal positions, the check involves the NOR element 49. The first check includes buses 2LGS and 2LGK which are both at OV potential providing that the opposing signal 2L, over the switch normal, is not cleared and a clear signal request therefor has not been recorded. Bus 1NWS' is at OV potential if a reverse switch position has not been requested as this bus is equivalent to bus 1RWS shown in FIG. 3. Said in another way, bus 1NWS' is at OV potential when bus 1NWS is at −V potential to request a normal switch position. Bus 5—6BA is at OV potential, as shown in FIG. 1A, when blocking jack 5—6BJA is not actuated so that the entry of trains into the A track stretch is permitted. The bus 5-—6LAF, which will be discussed shortly in connection with FIG. 6, when at OV, indicates that the machine traffic circuits are in such condition that westbound traffic from location 6 over track stretch A is not established. With all of the input leads to NOR element 49 at OV potential, to satisfy the various routing checks, a −V potential output results which applied to NOR element 48 results in an output at OV potential. Thus all four inputs to NOR element 47 are at OV potential, if all of the route and suitability checks are satisfied, and the resulting −V output potential, when applied to input terminal S of flip-flop 2RGC, results through the inverting amplifier in a −V potential on the signal control request bus 2RGS. As shown in FIG. 9, with −V potential on this bus, a 2R clear signal control function is transmitted by the remote control system to the location 5 remote station.

If, along with clearing signal 2R, the operator selects a reverse switch control for the crossover, then the routing factors for flip-flop 2RGC involve not the inputs to NOR element 49 but rather the inputs to NOR element 50, since the second route available to the train, that is, over the crossover reversed, will be established. Under these conditions, bus 1RWS' is at the OV potential since, with a reverse switch requested, bus 1RWS (FIG. 3) is now at the −V potential. Said in another way, bus 1RWS', which is the same as bus 1NWS', at OV potential since a normal switch is not requested. With the crossover switches to be reversed so that the route is to track stretch B, the opposing signal then becomes signal 4L. Thus the route check must include the buses 4LGS and 4LGK. These will each be at OV potential if a clear signal 4L has not been requested and signal 4L is not already clear. Bus 5—6BB is at OV potential if the blocking jack 5—6BJB is not actuated, that is, the circuit interrupter is not open, the supply for this particular bus, shown at the right of FIG. 1A, being similar to that previously described for other blocking jacks. If traffic from location 6 is not established through track stretch B, then bus 5—6LBF will be at OV potential as will be subsequently made clear. With the routing checks satisfied, that is, a OV potential exists on each input to NOR element 50, then the −V output of this NOR element applied to the lower input of NOR element 48 results in a OV potential output. As was previously explained, with the other inputs to NOR element 47 at OV potential, this final OV potential input completes the sequence so that the output of NOR element 47 is −V potential. When applied to input terminal S of flip-flop 2RGC, the result is a −V potential applied to bus 2RGS to request a clear signal control function transmission for signal 2R. When the clear signal control function is received at the field station, together with the reverse switch control function, the field circuits will perform final safety checks and establish the proper indication to be displayed by signal 2R to indicate to the train crew that the established route is a diverging crossover movement.

A similar operation occurs if the dispatcher requests a clear signal on signal 2L. This is shown in the lower network of FIG. 4 involving flip-flop 2LGC and may be traced as desired in accordance with the previous description for the clearing of signal 2R. It is to be noted that since only one route is available to a train accepting a clear signal 2L, the circuit check for existing conditions requires only a single check over the one route with switch 1WA in its normal position. The routing check that this normal switch position has been requested or is stored is included in the inputs to the first NOR element 51 which directly provides the input signal to the flip-flop element. It is further to be noted that inputs to NOR element 52 include a check that the blocking jack for the single track stretch between location 5 and the next location 4 to the left is not actuated (bus 4—5BA) and that traffic from location 4 to location 5 has not been established (bus 4—5RAF).

Under normal circumstances, the clear signal control storage is canceled, that is, the flip-flop is reset when the train accepts the signal and moves into the switch detector section. For example, continuing the above description for signal 2R, when the train accepts the clear indication on signal 2R and moves into switch detector section 1T, the track occupancy indication is received from the field location to light lamp 1TKE. This −V potential on bus 1TK (from FIG. 9) is also applied to input terminal C of flip-flop 2RGC. This cancels the signal request by resetting the flip-flop so that the OV potential appears at output terminal 2 and, through the inverting amplifier, is converted to a −V potential on bus 2RGS'. Conversely, bus 2RGS changes from its −V potential to a OV potential. It may also be noted that the −V potential is applied over bus 1TK to an input of NOR element 47 to assure that the output of this NOR element changes to OV potential to assist in the resetting of the flip-flop 2RGC.

However, the clear signal control storage may also be canceled by manual operation of pushbutton 2RPB by the system operator. In order to return the clear signal to its stop indication, pushbutton 2RBP is pulled to close the lower contact. At the same time, the operator must select location 5 to associate his operation of the signal pushbutton with the desired location. As will be obvious, the operation of pushbutton 2RPB to close its lower contact applies a −V potential through the inverting amplifier so that OV potential appears on bus 2LRRPB'. It may be noted that a similar potential is applied to this bus if a left signal had been cleared and pushbutton 2LPB is operated to close its lower contact to cancel such a signal. With location 5 selected, OV potential is applied to bus LOC5' and, as just described, the operation of the signal pushbutton has applied OV potential to bus 2LRRPB'. Both inputs to NOR element 53 are thus at OV potential so that its output is at a −V potential which is applied to input terminal C of flip-flop 2RGC in a manner similar to that just described when a −V potential is applied from bus 1TK. Flip-flop 2RGC is returned to its normal condition so that the −V potential at bus 2RGS is changed to a OV potential while the output from terminal 2 through the inverting amplifier applies a −V potential to bus 2RGS'. It may be noted that the same inputs are applied to NOR element 54 associated with flip-flop 2LGC so that a −V potential is applied to input terminal C of this latter flip-flop element to assure that it is also in its clear or reset condition so that there is no −V potential at bus 2LGS to inadvertently request a clear left signal. With both buses 2RGS and 2LGS at OV potential, the application of these potentials to NOR element 67 (FIG. 9) applies a −V potential to the portion of the remote control system which transmit a normal signal control to both units at field location 5. Actually both of these signal devices will be held at an intime condition to assure that a moving train will not overrun an opposing clear signal.

Similar circuit networks exist for each pair of signals at a particular location, for example, for the signals 4R and 4L as shown in FIG. 5. It is believed that the operation of the networks for this pair of signals will be obvious from the above description when taken with the circuits of FIG. 5. It may be noted that the circuit network for the control of flip-flop 4LGC, which is the controlling element for the functions for requesting a clear signal on 4L, is similar to the network for requesting a clear signal 2R. In each case two track routes are possible for trains accepting the clear signal. Conversely, the network controlling flip-flop 4RGC, which is involved in a clear signal request for signal 4R, is similar to that for signal 2L, since in each case only a single route is available to that train.

I have chosen to assume that the wayside signal circuits involved in the specific arrangement discussed herein do not require the transmission of separate traffic control function to the field station. Rather, the system is assumed to be such that a transmission of a clear signal control function will also establish traffic through the track stretches in the proper direction for the clear signal. Such wayside signaling systems are known in the art and will be understood by those so skilled. However, machine traffic circuits are still necessary, primarily to avoid the inadvertent transmission of a clear signal control which will return an already clear signal to the stop indication in the face of an approaching train and cancel the established traffic direction. Such an occurrence is not dangerous to the operation of the train, but is inconvenient and may cause unnecessary emergency stops. However, if the transmission of a traffic control function is necessary in the wayside signaling arrangement used, the machine traffic circuit herein discussed will also provide for the transmission of such control functions. These machine traffic circuits are shown in FIG. 6 and reference is now made to this FIG. for the subsequent discussion. It is to be noted that, in FIG. 6, where a parenthetical prefix, that is, (6), is added to the reference for a signal potential bus, it designates that the particular lead and the corresponding signal potential are provided by a circuit network exclusively associated with location 6 shown in dotted condition in FIG. 1A. Such circuits are not specifically shown in the drawings herein but are similar to those shown and previously described for location 5. Reference characters without the parenthetical prefix designate circuits or leads from the networks for location 5.

In the machine traffic circuits, a flip-flop unit is provided for establishing traffic direction in each stretch of track between adjacent locations. For example, between locations 5 and 6, there is provided, as shown in FIG. 6, flip-flop 5—6AF for the A track section and flip-flop 5—6BF for the B track section. In each flip-flop unit, a −V potential applied to input terminal S establishes traffic direction to the left, as shown by the parenthetical symbol (L) adjacent the reference character S. This traffic direction is generally, in such track diagrams, designated as westbound traffic. With such an input potential, a −V potential is provided from output terminal 2 and this potential appears on the bus 5—6LAF to establish and designate the westbound traffic direction. Conversely, traffic to the right or eastbound traffic is established when a −V potential is applied to input terminal C, i.e., (R), of the flip-flop. This results in a −V output from terminal 1 of flip-flop 5—6AF which is applied to the bus 5—6RAF to designate that eastbound traffic is established.

I shall now describe the operation of the traffic network when the request is made to clear signal 2R with the crossover switches in their normal position. In other words, the following description covers the operation when a request is made to establish a train movement through the switch detector section and into the A track section in the eastbound direction from location 5 to location 6. For this movement, −V potential must be applied to input terminal C of flip-flop 5—6AF so that a −V potential will exist on bus 5—6RAF to establish and identify the eastbound traffic direction. With location 5 selected and a control for a normal switch and a right signal established, the inputs to NOR element 55 in the upper right of FIG. 6 are all at OV potential. Specifically, bus 2RPB' is at OV potential since a 2R signal has been requested by the operation of the signal pushbutton 2RPB. Bus LOC5' is at OV potential due to the selection of location 5 and, since a normal switch has been requested, reverse condition bus 1NWS' then is at OV potential. With all the inputs at OV potential, the output of NOR element 55 is at −V potential and, since this is the single input to NOR element 56, the polarity is reversed so that a OV potential results at the output of NOR element 56 and is applied to one of the inputs of NOR element 57. The upper input to this latter NOR element, bus 5—6BAK, is at OV potential providing that the A track section is unoccupied, which is one of the conditions that must be met in order for the train to advance in the eastbound direction. The remaining input for NOR element 57 is the output of NOR element 58. The upper input of this NOR element is bus (6)1RWS. If the potential on this bus is OV, i.e., a reverse switch at location 6 is not requested, then the other input to NOR element 58 must be −V in order to satisfy the necessary conditions. The lower input to NOR element 58 is the output of NOR element 59 which checks by its inputs the condition of the westbound signal at location 6 and the occupancy of the switch detector section of that location. If the westbound signal at location 6, that is, signal 2L, is not cleared or a request for such clearance has not been recorded, then buses (6)2LGS and (6)2LGK will both be at OV potential. If the switch detector section at that location is also clear, then bus (6)1TK is also at OV potential. With all three inputs at the same OV potential, the output of NOR element 59 is at −V potential which when applied to NOR element 58 results in a OV potential output from this latter element. All three inputs of NOR element 57 thus being at the OV potential, the output is at −V potential. When applied to input terminal C of flip-flop 5—6AF, a −V potential results at output terminal 1 and thus on bus 5—6RAF, which establishes the eastbound traffic direction.

If a control for a reverse switch is recorded at location 6 so that bus (6)1RWS is at −V potential, then it is immaterial whether the inputs to NOR element 59 are all at OV potential since a single input at −V potential to NOR element 58 will result in the OV potential output which is required to establish the eastbound traffic. In other words, if the switch control stored at location 6 is for a reverse switch, then a control request for, or an indication of a clear signal 2L at location 6 may be recorded on the buses (6)2LGS and (6)2LGK or the switch detector section may be occupied at that location so that bus (6)1TK is at −V potential, since the OV potential output of NOR element 59 will have no effect upon the establishment of the traffic direction. It is thus obvious that a westbound train movement through track section stretch B from location 6 over a reverse switch at that location may be established and at the same time the 2R signal may be cleared at location 5 over the normal switch for a train to move through track stretch A in the eastbound direction. This is a normal and completely safe operation under traffic control systems with a track arrangement such as illustrated at the top of FIG. 1A.

It may also be noted that if signal 2R at location 5 is being cleared over the crossover in its reverse position, then input lead 1NWS' at NOR element 55 will be at a −V potential since this bus is the same as the 1RWS bus which must be at −V potential to request reverse switch positions. As the output of NOR element 55 will then be at 0V potential, and with the polarity reversal in NOR element 56, a −V potential will be applied to at least one input of NOR element 57. The output of this last NOR element will then be at 0V potential and applied to input terminal C of flip-flop 5—6AF will not result in −V potential at output terminal 1 and thus eastbound traffic in the A track stretch will not be established. Under this condition, westbound traffic direction may be established with complete safety from location 6 over the switch normal and signal (6)2L cleared. The manner in which a −V potential is applied from NOR element 60 to input terminal S of flip-flop 5—6AF to establish this westbound traffic will be obvious from the preceding discussion, if it is remembered that the upper input lead 1RWS to NOR element 68 is at −V potential.

Referring to the original conditions, in which signal 2R at location 5 is cleared over the crossover switches in their normal position, I shall now describe further operation of the traffic network to simultaneously clear signal 4R over the crossover switches normal into the B track stretch, establishing eastbound traffic in that stretch. If this is to be done, of course, no westbound traffic and thus no signal 2L can be cleared, or a request made therefore, at location 6 and such conditions will be assumed in the following description. In order to establish the eastbound traffic in track stretch B, that is through this track stretch from location 5 to location 6, a −V potential must be applied to input terminal C of flip-flop 5—6BF in order to provide a −V output at terminal 1 and thus on bus 5—6RBF. The lower input terminal of NOR element 61 must be at 0V potential, that is, bus 5—6BBK must be at this potential to signify that the track stretch B is not occupied by any train, particularly by an opposing direction train. Referring now to NOR element 62 at the lower right, since location 5 is selected, bus LOC5' will be at 0V potential as will bus 1NWS' since a normal switch control has been recorded. Likewise, with the request for a clear signal 4R, bus 4RPB' will be at 0V potential in a manner similar to that previously described for the operation of the pushbuttons for signal 2R. With all three inputs to NOR element 62 at 0V potential, an output potential of −V results which is applied at the lower input of NOR element 63. This results in an application of a 0V potential to the middle input of NOR element 61. It may be noted that, under the assumed conditions, NOR element 62 output is the controlling input for NOR element 63 since the lower input of NOR element 64, that is, bus 1RWS', is at −V potential due to the normal switch request. This results in a 0V potential output for application to NOR element 63 at its upper input terminal. Finally, since it is assumed that, at location 6, no signal is cleared and the switch detector section is not occupied, all inputs to NOR element 59 are at 0V potential, in a manner previously described. The output of this NOR element, at −V potential, is applied to the upper input of NOR element 65, as well as to NOR element 58. With this −V input, the output of NOR element 65 is then at 0V potential and the potential on bus (6) 1NWS at its lower input is immaterial. All three inputs to NOR element 61 have been established at 0V potential so that the output becomes a −V potential for application to input terminal C of flip-flop 5—6BF.

Thus it is shown that, simultaneously with the clearing of signal 2R for a train moving in the eastbound direction from location 5 into track stretch A, a parallel train movement controlled by signal 4R may be made over the crossover normal into track stretch B in an eastbound direction. This can occur, of course, only if no westbound movement at all is established from location 6. It is also obvious that, with the system at rest, a description could be provided for the establishment of eastbound traffic to track stretch B over the crossover in its reverse position and signal 2R cleared. Under this condition, NOR element 64 provides the critical input to NOR element 63 rather than NOR element 62. However, it is believed that this description, if desired, may be completed by reference to the above description and the accompanying drawing without being specifically detailed herein. Likewise, the specific description for establishing the westbound traffic from location 6 and the operation of the machine traffic circuits under such conditions is not given in detail.

Thus the system of my invention provides, in a remote control system, an improved arrangement comprising logic circuit elements for requesting and registering control functions that are to be transmitted to the remote field locations for accomplishment. At the same time, the arrangement described herein retains the single typical set of function control devices, specifically shown as pushbuttons, for use throughout the entire system. This typical set is associated with the selected location by the location or station selection network through the use of logic circuit elements. The disclosed arrangement reduces the space requirements for the machine circuitry, thus allowing longer and larger territories to be remotely controlled from a single control machine. At the same time, suitability and routing checks are conveniently incorporated into the control circuit arrangements to assure the proper registry of control functions and to prevent the inadvertent transmission of improper control functions to the field stations. The selected control functions are registered and stored by flip-flop circuit elements where they are retained until changed so that a future reference as to the existing functions may be had at any time that function controls are being selected for that or other locations associated therewith. Once a control function is stored in the appropriate flip-flop element, change may be by selection of a new control function which is of the reverse nature as illustrated by the description of the registry of functions for the switch machines. On the other hand, the change may occur by cancellation of the control function from the flip-flop element and the restoration of the element to its nonactuated condition. A typical example is that of the cancellation of a clear signal control function as a result of the receipt of an indication of track occupancy as a train moves past the clear signal at the field location. A second cancellation method, particularly for clear signals, is a return of the signal to its stop indication through manual operation. Since the control functions are stored within the flip-flop arrangement, a quick reference is thus available in subsequent actuation of the machine control devices and within the machine circuitry itself as to the existing or the last requested control function for each item at the field locations. Overall, then, the system of my invention, as described herein, provides an improved circuit arrangement for remote control systems, particularly for railroad traffic control center systems, which is efficient and convenient to operate and provides a complete check of existing safety factors and control functions.

Although I have herein described and illustrated but one specific embodiment of the arrangement of my invention in a traffic control system, it is to be understood that various changes and modifications may be made therein within the scope of the appended claims without departing from the spirit and scope of my invention.

I claim:

1. In a remote control system comprising a master control location and a plurality of remote locations connected by a communication system for transmitting control and indication functions between said locations, at said control location, the combination comprising:

a. a storage means operable to a first and a second condition to store a control for the corresponding position of a two position control function;

1. said storage means changing condition only when an operating signal is applied thereto;

b. a first control circuit means including at least one selected logic circuit element and electrically coupled for selectively supplying an operating signal to operate said storage means to its first condition when said one logic circuit element is actuated;

c. a second control circuit means including at least another selected logic circuit element and electrically coupled for selectively supplying an operating signal to operate said storage means to its second condition when said other logic circuit element is actuated;

d. a first and a second control function circuit means controlled by said storage means and separately activated as the associated storage means is operated to its first and second condition, respectively;

e. each control function circuit means coupled to said communication system for actuating the transmission of the associated control function position when the circuit is activated; and f. a function selector means operable at times for selectively actuating said one or said other logic circuit element.

2. A remote control system as defined in claim 1 in which each control circuit means includes additional logic circuit elements, each selectively conditioned in response to the application of preselected safety factors related to the associated control function, said logic circuit elements interconnected to control the corresponding control circuit means for inhibiting the supply of said operating signal to said storage means when any one of said related factors is in an unsafe condition.

3. A remote control system as defined in claim 2 in which said master control location is the traffic control center for a railroad signaling system for a stretch of track and said remote locations are track interlockings along said stretch at which the two position control functions comprise the positioning of track switches and wayside signals to control the movement of trains over said stretch of track, a separate combination of a storage means, first and second control circuit means, and first and second control function circuit means being provided at said master control location for each of said two position control functions.

4. A remote control system as defined in claim 3 in which each of said separate combinations further comprises:

a. connecting means from said communication system for supplying received indication functions as inputs to selected logic circuit elements as safety factor condition check signals; and b. other connecting means from said storage means to selected logic circuit elements in others of said combinations for supplying stored control functions to complete the safety factor condition checks.

5. A remote control system as defined in claim 4, said master control location further including:

a. a single bank only of function selector means one for each control function at any one remote location manually operable for selecting the desired control functions for transmission to any remote location;

b. a bank of remote location selection devices manually operable to select the desired remote location;

c. a circuit network means including still other logic circuit elements and controlled by said location selection devices for registering the selected location; and d. connecting means controlled by said function selector means and said location registering circuit network means for applying each control function selection to the logic elements of the control circuit means of the corresponding control function combination for the selected remote location.

6. A remote control system as defined in claim 5 in which each logic circuit element is a NOR logic circuit and each storage means is a flip-flop logic circuit arrangement.

7. In a railroad traffic control system comprising a master location including a system control machine and a plurality of remote locations connected by a communication system for transmitting control and indication functions between said locations, each function representing the condition of a two position controlled device, in the control machine at the master location, for each remote location the combination comprising:

a. a plurality of logic element storage means one for each two position control function, each storage means operable to a first and a second condition to store a first and a second position control, respectively, for the associated function;

b. an input circuit network means coupled to each storage means for selectively operating the corresponding storage means to its first or second condition;

1. each said input circuit network means including logic elements for combining a plurality of signals, each representing a separate safety check factor related to the selected control function, into a single check signal which actuates said storage means to the selected condition only when the combined safety check signal designates correct conditions for the selected position of that control function; and c. output circuit means for each storage means electrically coupled to said communication system for actuating the transmission of the selected control function to the remote location only when that associated storage means is in the selected condition.

8. A traffic control system as defined in claim 7 in which the controlled devices at each remote location include track switches and wayside signals to control the movement of trains, each remote location combination within said machine further comprising:

a. at least one storage means for storing the control functions for the wayside signals for each direction of train movement;

b. at least one storage means for storing the control functions for the track switches;

c. a traffic direction storage means for at least one adjacent track stretch; and d. each input circuit network means having input connections further coupled for receiving in selected logic elements said safety check signals pertaining to the associated control function from other storage means and from received indication functions.

9. A traffic control system as defined in claim 8, in which the control machine further includes:

a. a single set of manually operable control devices to select the desired control functions to be transmitted to any remote location;

b. a location selection network means for selecting a particular one of said remote locations; and c. said location selection network means electrically coupled to the several input circuit network means and to said control devices for applying the desired control functions selected on said control devices to the corresponding storage means for only the selected location to be transmitted only to the selected remote location.

10. A traffic control system as defined in claim 9 in which each of said storage means is a flip-flop logic circuit arrangement and each of said logic elements is a NOR logic circuit.